US011922389B2

(12) United States Patent
Kida et al.

(10) Patent No.: US 11,922,389 B2
(45) Date of Patent: Mar. 5, 2024

(54) PAYMENT TERMINAL

(71) Applicant: PANASONIC INTELLECTUAL PROPERTY MANAGEMENT CO., LTD., Osaka (JP)

(72) Inventors: Kyohei Kida, Kanagawa (JP); Yasuyuki Tanaka, Kanagawa (JP); Yasuji Wakiyama, Kanagawa (JP); Takeyuki Sasaki, Kanagawa (JP); Kohei Takada, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 215 days.

(21) Appl. No.: 17/466,423

(22) Filed: Sep. 3, 2021

(65) Prior Publication Data
US 2022/0076224 A1 Mar. 10, 2022

(30) Foreign Application Priority Data

Sep. 7, 2020 (JP) ................................. 2020-149879

(51) Int. Cl.
*G06Q 20/20* (2012.01)
*H04N 23/57* (2023.01)
(52) U.S. Cl.
CPC ......... *G06Q 20/204* (2013.01); *G06Q 20/208* (2013.01); *H04N 23/57* (2023.01)
(58) Field of Classification Search
CPC ... G06Q 20/204; G06Q 20/208; H04N 5/2257
USPC ......................................................... 705/17
See application file for complete search history.

(56) References Cited

U.S. PATENT DOCUMENTS

| 11,074,566 | B2 * | 7/2021 | Lee ...................... G07G 1/0018 |
| 2004/0132437 | A1 | 7/2004 | Ohmori et al. |
| 2006/0261155 | A1 * | 11/2006 | Templeton ............... G07G 1/12 |
| | | | 235/383 |
| 2012/0268398 | A1 | 10/2012 | Kato |
| 2016/0070964 | A1 | 3/2016 | Conrad |

(Continued)

FOREIGN PATENT DOCUMENTS

| AU | 2017213565 A1 * | 8/2017 |
| CN | 1708971 | 12/2005 |

(Continued)

OTHER PUBLICATIONS

Japan Office Action issued in Japan Patent Application No. 2022-194158, dated Sep. 19, 2023, together with English translation thereof.

*Primary Examiner* — Ariel J Yu
*Assistant Examiner* — Denisse Y Ortiz Roman
(74) *Attorney, Agent, or Firm* — Greenblum & Bernstein, P.L.C.

(57) ABSTRACT

A payment terminal includes a camera configured to capture an image, a card slot for inserting a contact type IC card, and a panel arrangement surface on which a touch panel is arranged. A lens of the camera, the card slot, and the panel arrangement surface are arranged in order in the height direction from a placement surface of the payment terminal. The panel arrangement surface is oriented obliquely upward toward a user positioned in front of the card slot. An optical axis direction of the lens is obliquely upward toward the user, and the lens is provided closer to the user than the card slot.

15 Claims, 12 Drawing Sheets

(56) References Cited

U.S. PATENT DOCUMENTS

| | | |
|---|---|---|
| 2016/0259531 A1 | 9/2016 | Cho et al. |
| 2016/0260086 A1 | 9/2016 | Cho et al. |
| 2019/0066076 A1 | 2/2019 | Lee et al. |

FOREIGN PATENT DOCUMENTS

| | | |
|---|---|---|
| CN | 102760336 | 10/2012 |
| CN | 105573201 | 5/2016 |
| CN | 205302497 U | 6/2016 |
| CN | 105938592 | 9/2016 |
| CN | 206133584 U | 4/2017 |
| CN | 206489672 U | 9/2017 |
| CN | 107424362 | 12/2017 |
| CN | 206946625 U | 1/2018 |
| CN | 207337570 U | 5/2018 |
| CN | 208208012 U | 12/2018 |
| CN | 209514797 U | 10/2019 |
| JP | 2004-258883 | 9/2004 |
| JP | 2012-128238 | 7/2012 |
| JP | 2012-185543 | 9/2012 |
| JP | 2014-199683 | 10/2014 |
| JP | 2016-81527 | 5/2016 |
| JP | 2019-117511 | 7/2019 |
| JP | 2020-027521 | 2/2020 |
| JP | 2020-135427 | 8/2020 |

\* cited by examiner

PAYMENT TERMINAL

CROSS-REFERENCE TO RELATED APPLICATIONS

This application is based on and claims priority under 35 USC 119 from Japanese Patent Application No. 2020-149879 filed on Sep. 7, 2020, the contents of which are incorporated herein by reference.

TECHNICAL FIELD

The present disclosure relates to a payment terminal.

BACKGROUND ART

In the related art, a payment terminal including a card reader and a touch panel has been known (see JP-A-2014-199683). In the related art, code settlement using a one-dimensional code or a two-dimensional code has been known as a settlement method for performing settlement processing (see JP-A-2020-027521). JP-A-2020-027521 discloses that a store terminal serving as a POS terminal used by an administrator of a store includes a reading device that reads an integrated circuit (IC) card owned by a user, information stored in a user terminal having a function equivalent to that of the IC card, or a one-dimensional code (for example, a barcode) or a two-dimensional code (for example, a QR code (registered trademark)). The one-dimensional code or the two-dimensional code is displayed on a display surface which is an output unit of the user terminal.

It is assumed that configurations of the payment terminal and the store terminal in JP-A-2014-199683 and JP-A-2020-027521 are combined to implement a payment terminal corresponding to a plurality of settlement methods. It is assumed that this payment terminal includes a card reader, a touch panel, and a camera serving as a reading device of a two-dimensional code. In this case, by devising an arrangement position of the camera, for example, it is possible to reduce a size of the payment terminal, to improve arrangement efficiency of the camera, and to improve visibility of a display unit (for example, the touch panel) at a time of capturing an image by the camera while supporting the plurality of settlement methods.

SUMMARY OF INVENTION

An object of the present disclosure is to provide a payment terminal that can support various settlement methods, can reduce a size of the payment terminal, can improve arrangement efficiency of an image capturing unit, and can improve visibility of a display unit at a time of capturing an image.

Aspect of non-limiting embodiments of the present disclosure relates to provide a payment terminal includes a camera configured to capture an image, a card slot for inserting a contact type IC card, and a panel arrangement surface on which a touch panel is arranged. A lens of the camera, the card slot, and the panel arrangement surface are arranged in order in the height direction from a placement surface of the payment terminal. The panel arrangement surface is oriented obliquely upward toward a user positioned in front of the card slot. An optical axis direction of the lens is obliquely upward toward the user, and the lens is provided closer to the user than the card slot.

According to the present disclosure, it is possible to support various settlement methods, to reduce a size of a payment terminal, to improve arrangement efficiency of an image capturing unit, and to improve visibility of a display unit at a time of capturing an image.

BRIEF DESCRIPTION OF DRAWINGS

Exemplary embodiment of the present disclosure will be described in detail based on the following figures, wherein.

DESCRIPTION OF EMBODIMENTS

Hereinafter, an embodiment will be described in detail with reference to the drawings as appropriate. However, an unnecessary detailed description may be omitted. For example, a detailed description of a well-known matter or a repeated description of substantially the same configuration may be omitted. This is to avoid unnecessary redundancy in the following description and to facilitate understanding of those skilled in the art. The attached diagrams and the following description are provided for those skilled in the art to sufficiently understand the present disclosure, and are not intended to limit the matters described in the scope of the claims.

Background of Attaining Embodiment of Present Disclosure

When a payment terminal includes a card reader, a touch panel, and a camera, it is generally assumed that the camera is provided outside a display region of the touch panel on a top surface of the payment terminal. This is because the display region of the touch panel can be secured, and a member of the payment terminal blocking an upper portion of the camera is not present. A configuration of this payment terminal is a configuration according to a comparative example.

However, in a case of this comparative example, since a lens of the camera is located on the top surface of the payment terminal, at a time of capturing an image using the camera (for example, at a time of a code settlement), the display region of the touch panel may be blocked with a hand, a finger, or the like of a user, and visibility of display performed by the touch panel may be deteriorated.

Since the camera is provided in a region outside the touch panel on the top surface of the terminal, a space for providing the camera is required in addition to the display region of the touch panel. As a result, a space for providing electronic components for supporting various settlement methods is required, and a size of the payment terminal may be increased. Inside the payment terminal, it is preferable that the camera is provided in a region where the number of arrangements of members is relatively small.

In the following embodiments, a description will be given of a payment terminal that can support various settlement methods, can reduce a size of the payment terminal, can improve arrangement efficiency of an image capturing unit, and can improve visibility of a display unit at a time of capturing an image.

EXEMPLARY EMBODIMENT

Figure 1:
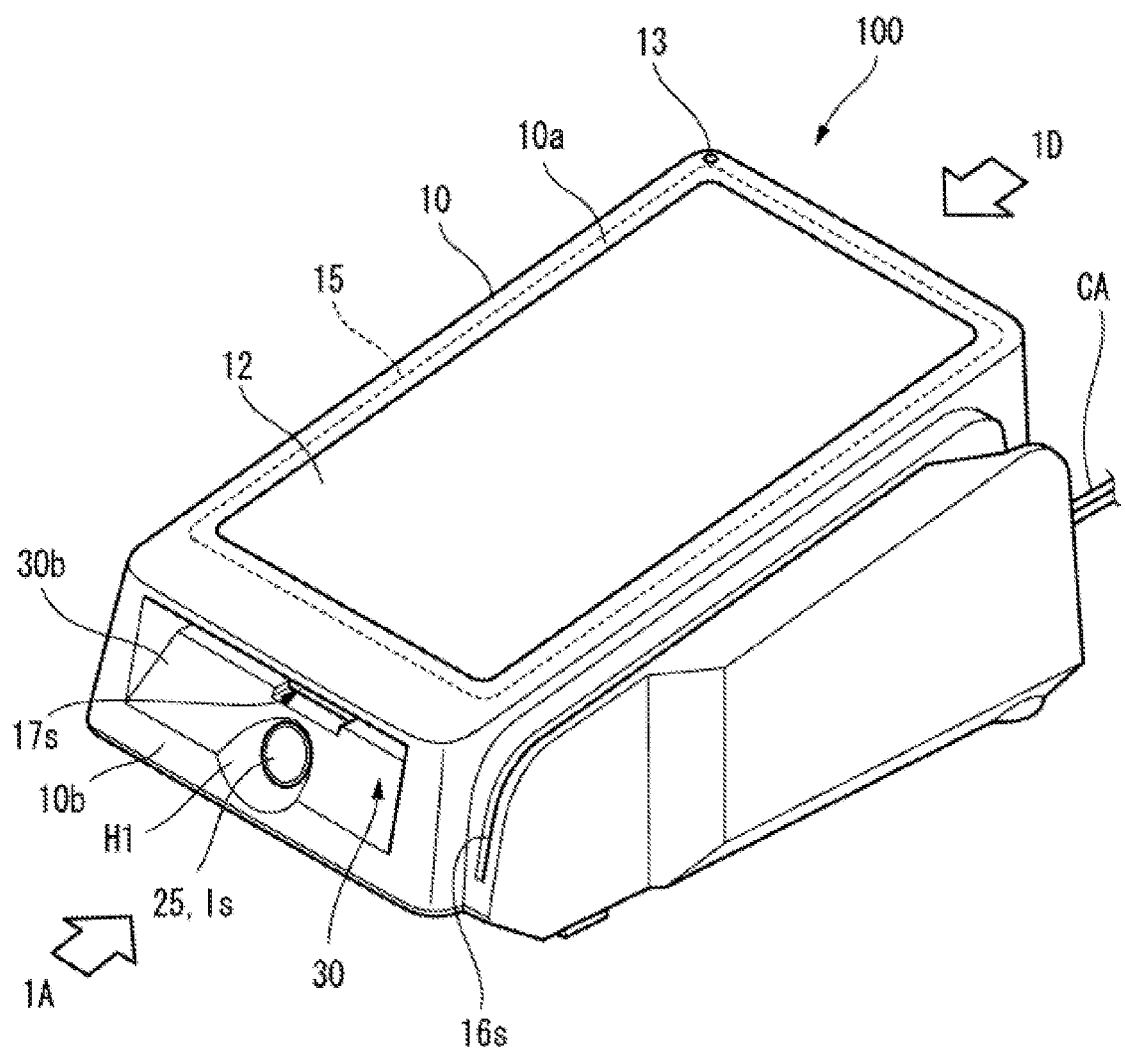
FIG. 1 is a front perspective view showing an example of an appearance of a payment terminal according to an exemplary embodiment of the present disclosure.

FIG. 1 is a front perspective view showing an example of an appearance of a payment terminal 100 according to an exemplary embodiment. The payment terminal 100 includes a main body 10. The main body 10 generally has a box shape, for example. For example, a user operates the payment terminal 100 from a front surface 1A side of the payment terminal 100. The user may be a purchaser of a product or a customer of a store. The payment terminal 100 is connected to a store terminal 200 operated by a clerk. The payment terminal 100 may execute various types of settlement processing in cooperation with the store terminal 200. The store terminal 200, for example, inputs a product, inputs an amount of money, selects a settlement method, and the like via an input device provided in the store terminal 200.

The payment terminal 100 includes a touch panel 12, a light emitting diode (LED) 13, a near field communication (NFC) antenna 15, a first card slot 16s, a second card slot 17s, and a camera 25. The payment terminal 100 includes a cable CA on a rear surface 1D side. The cable CA may include a power cable, a communication cable, a local area network (LAN) cable, a universal serial bus (USB) cable, and the like.

The payment terminal 100 is of a complex type capable of executing the settlement processing according to a plurality of settlement methods. For example, the payment terminal 100 may be used in a state of being placed on a placement surface α (see FIG. 4) of a counter 50 of the store. The payment terminal 100 may execute the payment processing according to any settlement method.

Examples of a plurality of settlement methods include a credit card settlement, an electronic money settlement, a code (such as a QR code (registered trademark)) settlement, and a cash settlement. The credit card settlement includes, for example, a magnetic card settlement, a contact type IC card settlement, and a non-contact type IC card settlement. Electronic money may include a plurality of types of electronic money. Since the electronic money settlement and the non-contact type IC card settlement are executed using non-contact communication (such as near field communication (NFC)), the electronic money settlement and the non-contact type IC card settlement are also collectively referred to as a non-contact type settlement.

The plurality of settlement methods are executed using a plurality of corresponding settlement interfaces. Examples of the plurality of settlement interfaces include a credit card, an electronic money card C32, a code, and cash. Examples of the credit card include a magnetic card C1, a contact type IC card C2, and a non-contact type IC credit card C31.

The magnetic card C1 is used for a settlement by being inserted into the first card slot 16s. The contact type IC card C2 is used for a settlement by being inserted into the second card slot 17s. The non-contact type IC credit card C31 and the electronic money card C32 are used for a settlement by being brought close to the NFC antenna 15. The non-contact type IC credit card C31 and the electronic money card C32 are also collectively referred to as a "non-contact type IC card C3".

Figure 2:
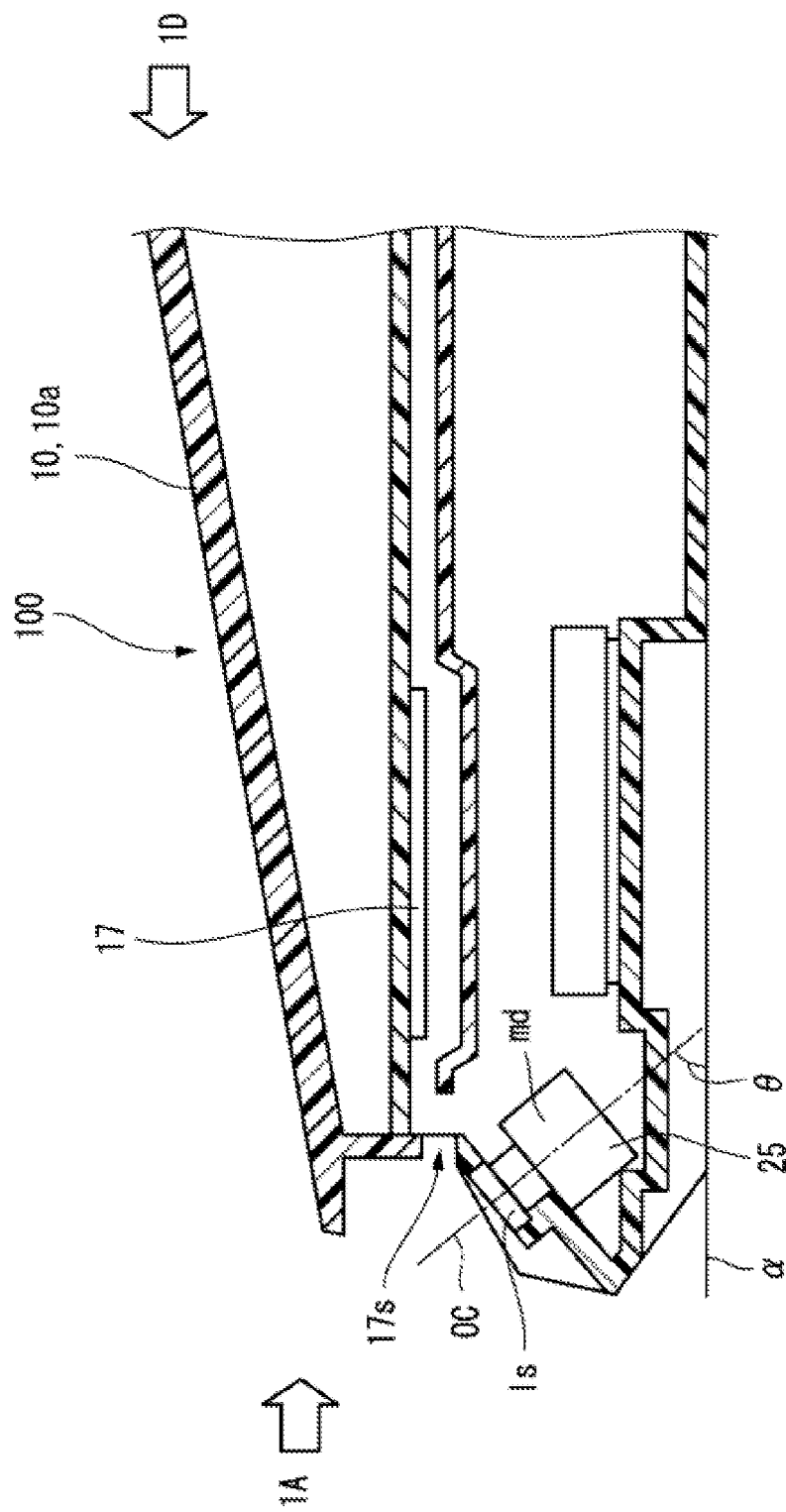
FIG. 2 is a schematic cross-sectional view perspectively showing an example of the payment terminal as viewed from a side surface.

The camera 25 includes a camera module md and a lens 1s (see FIG. 2). When viewed from an outside of the payment terminal 100, in the payment terminal 100, the lens 1s of the camera 25, the second card slot 17s, and the touch panel 12 are arranged in order from the placement surface α (from a vicinity of the placement surface α) in a height direction of the payment terminal 100 (a direction perpendicular to the placement surface α). When viewed from an inside of the payment terminal 100, in the payment terminal 100, the camera module md of the camera 25, a second card reader 17, the NFC antenna 15, and the touch panel 12 are arranged in order from the placement surface α (from the vicinity of the placement surface α) in the height direction. The NFC antenna 15 and the touch panel 12 may have the same height from the placement surface α, that is, the NFC antenna 15 may be provided around the touch panel 12 on the same surface. The surface on which the touch panel 12 is provided is also referred to as a panel arrangement surface 10a. The panel arrangement surface 10a may be an upper surface of the main body 10.

The first card slot 16s is provided on a right or left side surface side when viewed from the front surface 1A side, for example, on a right side surface side in FIG. 1 along the side surface. In this case, the user can easily select any settlement method from the plurality of settlement methods corresponding to the plurality of devices arranged in front of an eye.

A height of the payment terminal 100 on the rear surface 1D side is larger than a height of the payment terminal 100 on the front surface 1A side. That is, the panel arrangement surface 10a of the main body 10 of the payment terminal 100 is gradually lowered toward the user. That is, when the user faces the second card slot 17s in front, the panel arrangement surface 10a of the payment terminal 100 is oriented obliquely upward toward the user. On other words, a height of the panel arrangement surface 10a of the payment terminal 100 becomes high as distance from the user becomes larger.

The LED 13 is provided on the panel arrangement surface 10a of the main body 10 of the payment terminal 100. An arrangement position of the LED 13 is not limited thereto, and may be any position as long as the LED 13 is visible to the user.

The touch panel 12 is used for a settlement by a user, for example. The touch panel 12 may be provided over an entire surface of the panel arrangement surface 10a or may be provided on a part of the panel arrangement surface 10a. The touch panel 12 has an input function of receiving various operations by the user and inputting various types of data and information. The touch panel 12 has a display function of displaying various types of data, information, images, and the like. Therefore, the touch panel 12 can provide visual information to the user. On the touch panel 12, an input detection region where an input is detected and a display region where various types of display are performed may be the same region, or at least part of the input detection region and the display region may be different regions. The touch panel 12 is shown as an input unit for the user. However, the payment terminal 100 may include other input units (for example, physical keys and buttons).

The payment terminal 100 has, on the front surface 1A, an open space 30 in which a housing of the main body 10 is absent. In the open space 30, an opening is the widest on the front surface 1A side, and the opening is narrowed toward the rear surface 1D. That is, a diameter of the open space 30 increases from the rear surface 1D side toward the front surface 1A. The second card slot 17s and the lens is of the camera 25 are provided in the open space 30. For example, the second card slot 17s is located at a part of the open space 30 on the rearmost surface 1D side.

A lower surface 30b is provided at a lower portion of a peripheral end of the open space 30. The lower surface 30b may be a tapered surface that gradually approaches the placement surface α from the rear surface 1D side toward the front surface 1A. The lower surface 30b is formed in, for example, a substantially planar shape. A surface 10b and the lower surface 30b are connected to each other. The surface 10b is located at a lower periphery of the open space 30 on the front surface 1A side of the main body 10 of the payment terminal 100. A portion of a connecting part between the surface 10b of the main body 10 and the lower surface 30b of the open space 30 has a recessed shape, and forms a recess H1. The recess H1 is a part of the open space 30. A shape of a contour of the recess H1 is, for example, a semi-circular arc shape or a semi-elliptical arc shape. The lens 1s of the camera 25 is exposed in the recess H1. A front surface side of the lens 1s is not covered with the housing of the main body 10. Therefore, the camera 25 can introduce light from the outside of the payment terminal 100 via the recess H1. The lens 1s is provided in the recess H1, so that a finger of the user, dust, or the like at a time of a settlement is not likely to reach the lens 1s, and the lens 1s is protected from damage or adhesion of dirt.

FIG. 2 is a schematic cross-sectional view perspectively showing an example of the payment terminal 100 as viewed from the side surface. In FIG. 2, illustration of the touch panel 12, the NFC antenna 15, and the like is omitted.

In the payment terminal 100, the camera 25 may be provided on the front surface 1A side (a left side in FIG. 2) with respect to the second card slot 17s. That is, when the user faces the second card slot 17s in front, the lens 1s of the camera 25 may be provided closer to the user than the second card slot 17s. In this case, since the lens 1s of the camera 25 is relatively located on the front surface 1A side in the open space 30, the payment terminal 100 can easily introduce light from a subject (for example, a mobile terminal 300 on which a code is displayed) located outside the payment terminal 100. Therefore, the payment terminal 100 can capture an image of the code displayed on a display surface of the mobile terminal 300 with high image quality, and can improve recognition accuracy of the code. Examples of the mobile terminal 300 may include a smartphone, a mobile phone, and a tablet terminal.

In the payment terminal 100, the camera 25 is provided closer to the placement surface α than second card slot 17s. For example, a distance between the placement surface α and an arrangement position of the second card slot 17s, that is, a distance d2 between the placement surface α and the contact type IC card C2 inserted into the second card slot 17s may be such a length that a finger FG of the user who intends to insert the contact type IC card C2 can enter between the contact type IC card C2 and the placement surface α. Specifically, a distance d2 may be, for example, any length of 20 mm to 25 mm (see FIG. 4).

Accordingly, even in an arrangement position of the camera 25 according to the present embodiment, the user can insert the contact type IC card C2 into the second card slot 17s, and can execute a settlement using the contact type IC card C2. On a side closer to the placement surface α than the second card slot 17s, a dead space is likely to be generated inside the payment terminal 100. By providing the camera 25 at this position, the dead space inside the payment terminal 100 can be effectively used, and arrangement efficiency of the camera 25 can be improved. Therefore, it leads to a reduction of the size of the payment terminal 100 including the camera 25.

A normal direction of the camera 25 with respect to the lens 1s, that is, a direction (an optical axis direction) of the optical axis OC of the lens 1s, forms a predetermined angle θ (for example, approximately 50 degrees) with respect to the placement surface α. That is, the optical axis direction of the camera 25 is obliquely upward toward the user. On other words, the optical axis direction of the camera 25 is obliquely upward with respect to the placement surface α toward a front side of the payment terminal 100.

Figure 3:
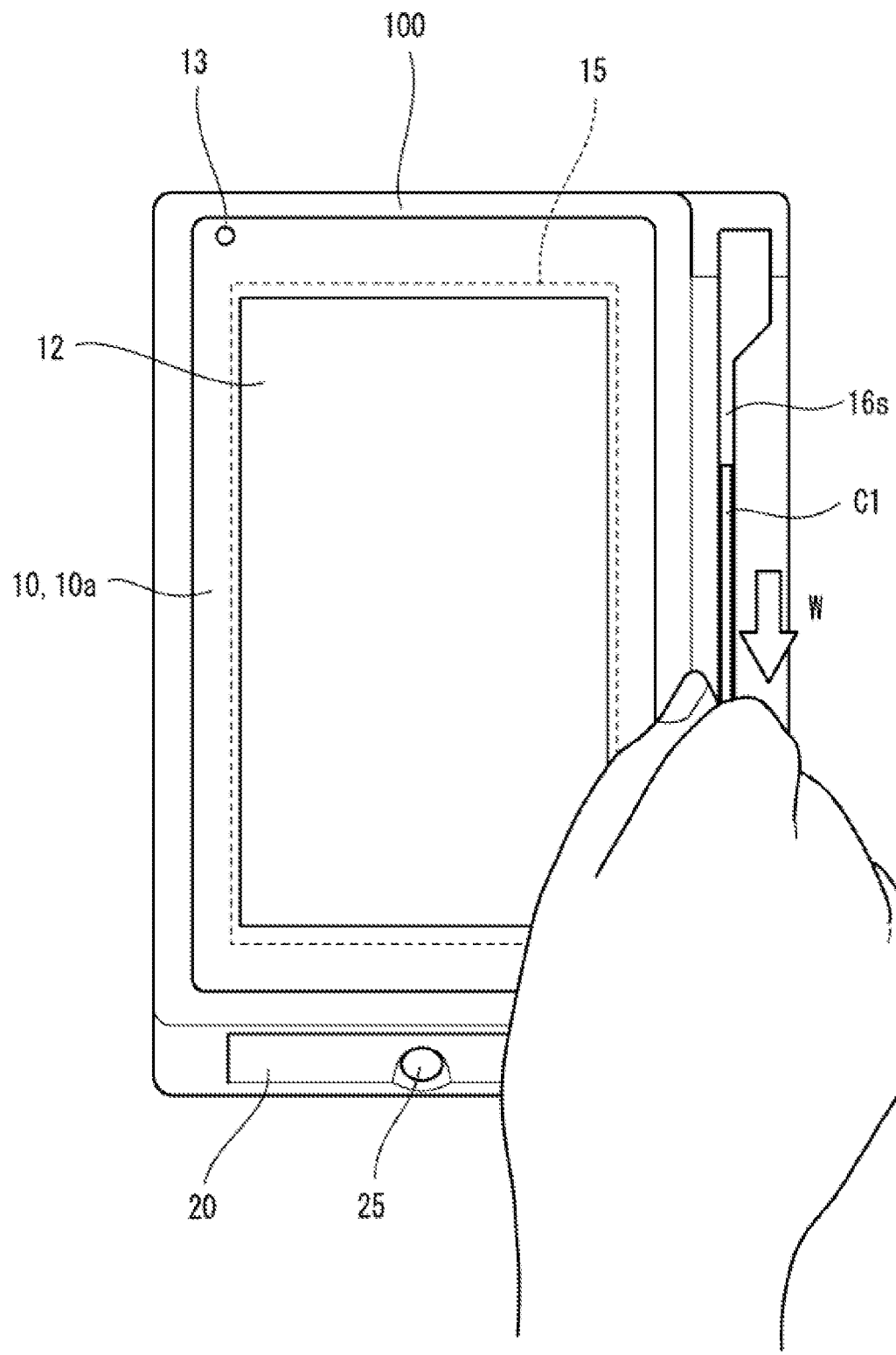
FIG. 3 is a side perspective view showing an example of a method for using a first card slot.

FIG. 3 is a top view showing an example of a method for using the second card slot 17s provided in the payment terminal 100.

The user, for example, faces the front surface 1A of the payment terminal 100, and swipes the magnetic card C1 with respect to the first card slot 16s in a direction w substantially parallel to the placement surface α. The magnetic card C1 includes at least one magnetic stripe. On the other hand, a first card reader 16 (see FIG. 6) having the first card slot 16s is provided with a magnetic head. Data is read and written between the payment terminal 100 and the magnetic card C1 by bringing the magnetic stripe into contact with the magnetic head.

Figure 4:
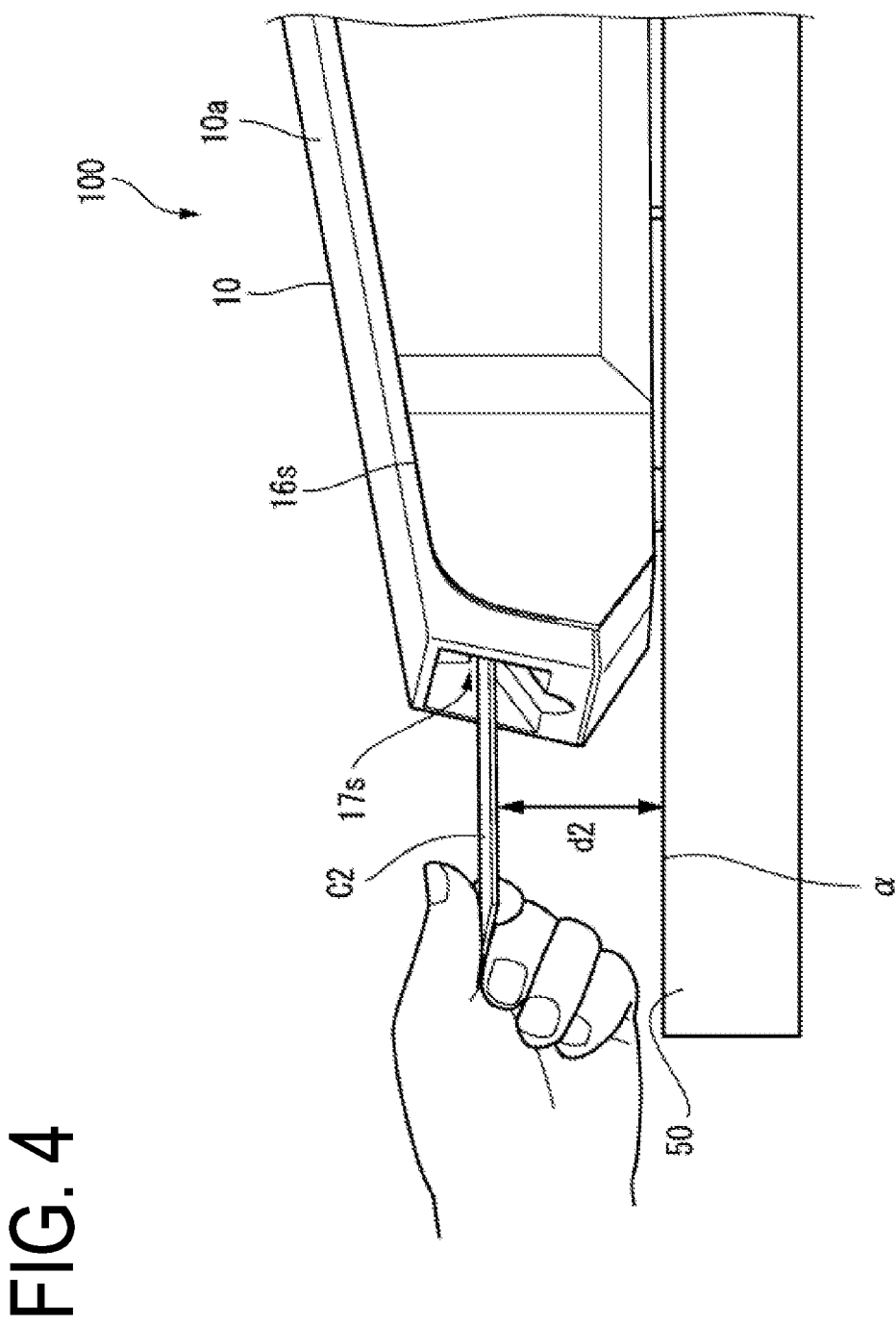
FIG. 4 is a side perspective view showing an example of a method for using a second card slot.

FIG. 4 is a side perspective view showing an example of a method for using the second card slot 17s provided in the payment terminal 100.

The user inserts the contact type IC card C2 in a direction substantially parallel to the placement surface α. The contact type IC card C2 includes an IC chip including a terminal. On the other hand, the second card slot 17s includes a contact terminal inside the second card slot 17s. Data is read and written between the payment terminal 100 and the contact type IC card C2 by bringing the terminal of the IC chip into contact with the contact terminal.

Figure 5:
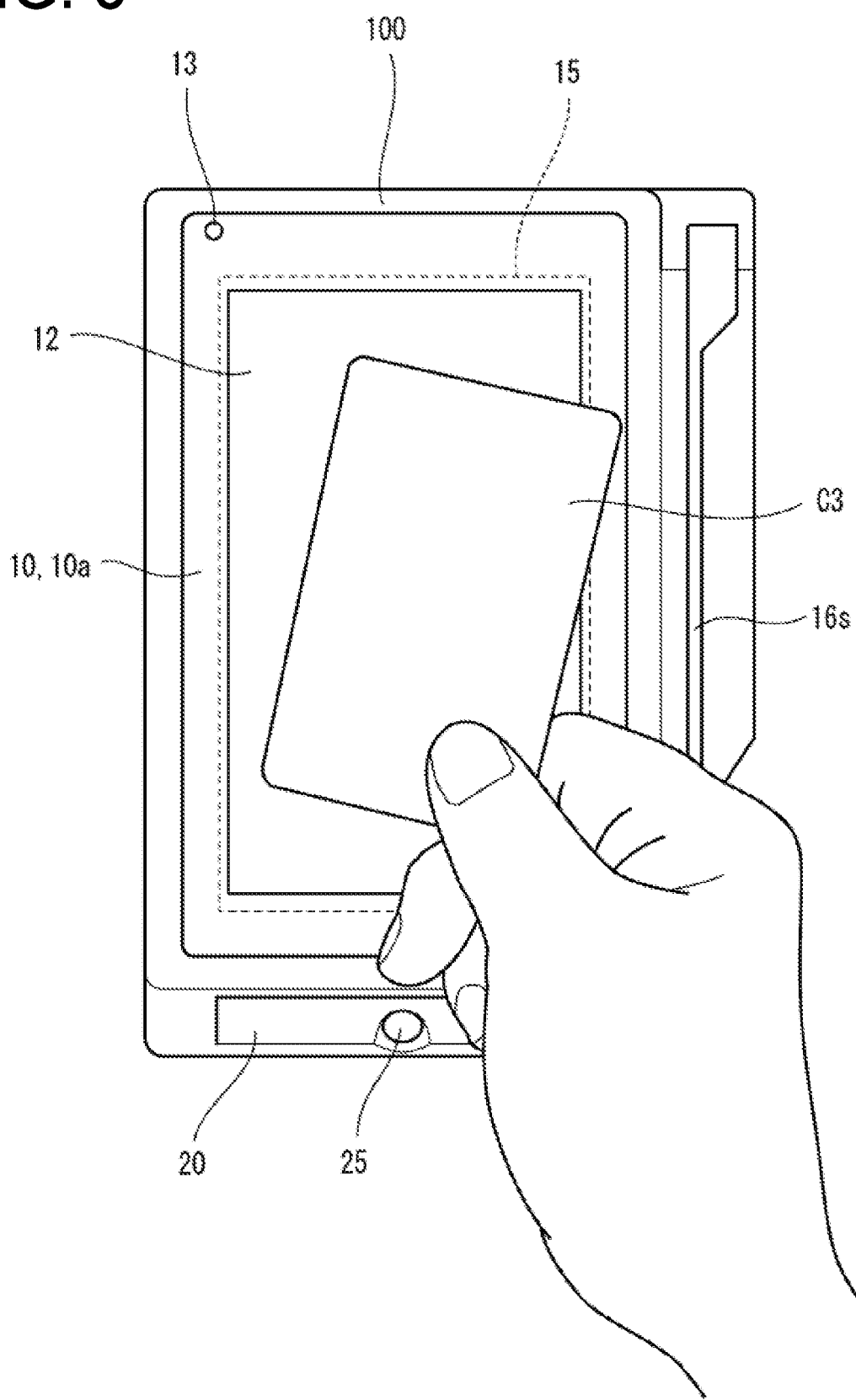
FIG. 5 is a top view showing an example of a method for using a non-contact type settlement using the payment terminal.

FIG. 5 is a top view showing an example of a method for using a non-contact type settlement using the payment terminal 100.

When a non-contact type settlement is executed, the user brings the non-contact type IC card C3 into contact with or close to the NFC antenna 15 provided near the panel arrangement surface 10a, so that non-contact type communication is executed between the IC chip provided in the non-contact type IC card C3 and the NFC antenna 15 on a payment terminal 100 side. Accordingly, data is read and written between the payment terminal 100 and the non-contact type IC card C3.

Figure 6:
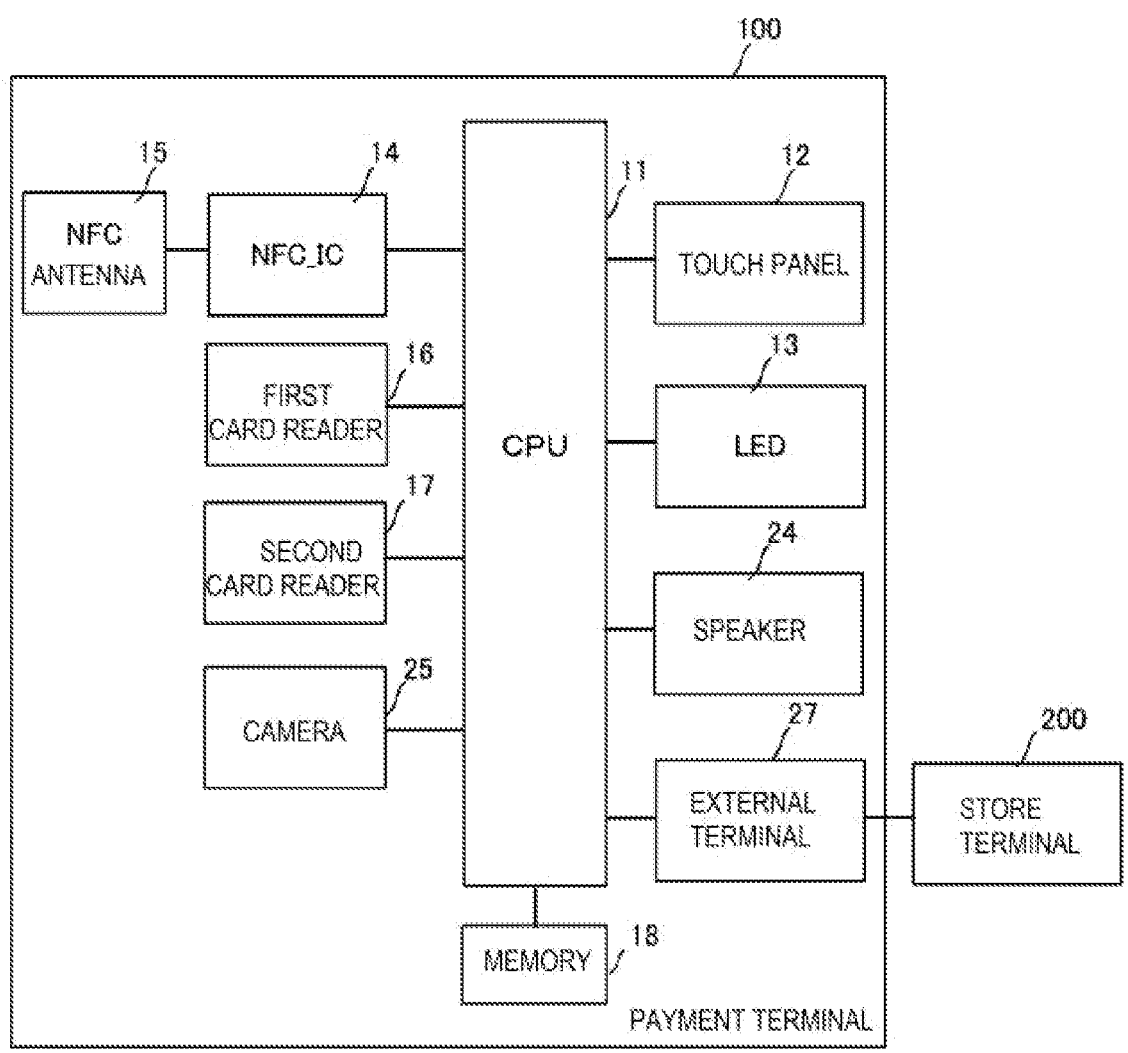
FIG. 6 is a block diagram showing an example of an electrical configuration of the payment terminal.

FIG. 6 is a block diagram showing an example of an electrical configuration of the payment terminal 100.

The payment terminal 100 includes a central processing unit (CPU) 11, the touch panel 12, the LED 13, an NFC_IC 14, the NFC antenna 15, the first card reader 16, the second card reader 17, a memory 18, a speaker 24, the camera 25, and an external terminal 27.

The CPU 11 is configured to implements various functions by executing a program stored in the memory 18. The CPU 11 is configured to collectively control each unit of the payment terminal 100. The CPU 11 is configured to execute, for example, processing related to various types of settlements (for example, a credit card settlement, an electronic money settlement, a code settlement, and a cash settlement). The CPU 11 is an example of a processor, and may be another processor. In the CPU 11, components (for example, the camera 25 (for example, the camera module md) and the second card reader 17) in the payment terminal 100 are electrically connected to each other, so that various types of data can be transmitted and received.

The touch panel 12 has an input detection function of electrically detecting an input (an input operation) of bringing a finger or the like (an example of an object) of the user into contact with or close to the touch panel 12. The touch panel 12 receives, for example, the input operation by the user. The touch panel 12 may receive an operation of a PIN input or an operation of an electronic signature in a credit card settlement.

The touch panel 12 is formed by stacking a glass substrate, a transparent electrode, a protective cover, and the like. Examples of a method for detecting an input by the touch panel 12 includes a resistive film method, an electrostatic capacitance method, and an electromagnetic induction method. However, as long as an input is electrically detected, any method may be used.

The touch panel 12 includes, for example, a liquid crystal display (LCD), and has a display function of displaying various types of data and information.

The touch panel 12 displays, for example, an image captured by the camera 25 at a time of a code settlement as a preview image. The user causes the display surface of the mobile terminal 300 to face the camera 25 in order to capture an image by the camera 25. As a result, even when it is difficult for the user to directly see the display surface of the mobile terminal 300, a state of the code displayed on the mobile terminal 300 with respect to the camera can be checked by checking a display of the preview image.

For example, the touch panel 12 displays a guidance image for guiding an arrangement position of the mobile terminal 300 with respect to the payment terminal 100 at the time of the code settlement. By checking the guidance image, the user can check how to execute the code settlement using the mobile terminal 300.

The touch panel 12 displays guidance information such that the mobile terminal 300 is in a predetermined arrangement state with respect to the payment terminal 100 in order to read the code by the camera 25. By checking the guidance information, the user can move the code displayed on the mobile terminal 300 to a position where the payment terminal 100 can read the code.

The LED 13 is configured to perform a display for notifying various types of information. The LED 13 may perform a display in various display modes. Examples of the display modes may include a display color (for example, red, green, and blue), a display timing (for example, a display during processing (settlement processing) related to a settlement and a display at a time of completion of the settlement processing), and a display pattern (for example, lighting, blinking, and lighting-off).

The NFC_IC 14 is configured to execute processing on the NFC antenna 15. For example, the NFC_IC 14 is configured to control power supply to the NFC antenna 15 and data communication via the NFC antenna 15.

The NFC antenna 15 is formed of, for example, a loop coil. The NFC antenna 15 is configured to receive power supply from the NFC_IC 14 and to generate radio waves. A region within a predetermined distance from the NFC antenna 15 is a region (a non-contact communicable region) where non-contact type communication with the NFC antenna 15 can be executed. When the non-contact type IC card C3 (an example of a communication medium capable of non-contact type communication) is provided in the non-contact communicable region, radio waves from the NFC antenna 15 arrives at the non-contact type IC card C3, and the NFC antenna 15 applies start-up power to the non-contact type IC card C3. Accordingly, the NFC antenna 15 communicates data with the non-contact type IC card C3.

A central position of a surface defined by the NFC antenna 15 may substantially coincide with a central position of a surface defined by the touch panel 12. Accordingly, data can be communicated between the NFC antenna 15 and the non-contact type IC card C3 by holding the non-contact type IC card C3 over the touch panel 12, and an operation can be easily understood by the user.

The NFC_IC 14 acquires (reads) information stored in the non-contact type IC credit card C31 via the NFC antenna 15. The NFC_IC 14 sends this information to the CPU 11 as non-contact read information. The information stored in the non-contact type IC credit card C31 and the non-contact read information include, for example, an identification number of a credit card. The NFC_IC 14 acquires (reads) information stored in the electronic money card C32 via the NFC antenna 15. The NFC_IC 14 sends this information to the CPU 11 as electronic money read information. The information stored in the electronic money card C32 and the electronic money read information include, for example, an identification number of the electronic money card C32.

The first card reader 16 is a module of a magnetic card reader. The first card reader 16 is configured to read information stored in the magnetic card C1 and to send the read information to the CPU 11 as magnetic read information. The information stored in the magnetic card C1 and the magnetic read information include, for example, an identification number of a credit card.

The second card reader 17 is a module of a contact type IC card reader. The second card reader 17 is configured to read information stored in the contact type IC card C2 and to send the read information to the CPU 11 as contact read information. The information stored in the contact type IC card C2 and the contact read information include, for example, an identification number of a credit card.

The memory 18 may include a read only memory (ROM), a random access memory (RAM), or the like. The memory 18 is configured to store various types of data, information, and programs.

The speaker 24 is configured to output various sounds. For example, the speaker 24 is configured to output a sound related to the processing (for example, the settlement processing) of the payment terminal 100.

The camera 25 includes the camera module md and the lens 1s. The camera module md executes processing related to capturing an image. The camera module md includes, for example, an image capturing element, an image processor, and other electronic components related to capturing an image. The camera module md is configured to capture an image of a subject and to obtain a captured image. The lens 1s is configured to converge light on the image capturing element in the camera module md. Here, processing executed by the camera module md will also be described simply as processing executed by the camera 25.

For example, the camera 25 captures an image of a code such as a two-dimensional code displayed on the display surface of the mobile terminal 300 of the user, and sends the captured image to the CPU 11. The CPU 11 analyzes the captured image and recognizes identification information (for example, identification information for identifying the user) necessary for a settlement indicated by the two-dimensional code or the like. The CPU 11 acquires this identification information as code read information. The code may be a code other than the two-dimensional code, and may be, for example, a bar code.

The external terminal 27 can connect various cables CA. Therefore, the external terminal 27 can be connected to the store terminal 200 via the various cables CA and can communicate with the store terminal 200. The store terminal 200 may include a point of sales system (POS), a cash register, and the like. Therefore, the external terminal 27 functions as a communication unit. The communication unit may execute wireless communication (for example, wireless LAN communication or Bluetooth (registered trademark) communication) without using the external terminal 27. For example, the CPU 11 may communicate data via the external terminal 27, may receive, from the store terminal 200, settlement amount information, settlement method selection information, and other information necessary for a settlement, and may transmit information related to a settlement to the store terminal 200.

The payment terminal 100 may have a security protection region in a part of the payment terminal 100. The security protection region is a region where security is enhanced as compared with a region other than the security protection region in the payment terminal 100. For example, the security protection region has a tamper resistance. Security of the security protection region may be logically enhanced by software processing, or may be physically enhanced by a structure or a mechanism of hardware. The security protection region mainly stores a member used for settlement processing using a card or the like.

Next, an operation of the payment terminal 100 at a time of the settlement processing will be described.

In the settlement processing, the CPU 11 acquires the settlement method selection information and selects the settlement method according to the selection information. The CPU 11 may acquire the settlement method selection information from the store terminal 200 via, for example, the communication unit, or may acquire the selection information from the user via the touch panel 12. In a case in which the settlement method is the magnetic card settlement, when acquiring the magnetic read information from the first card reader 16, the CPU 11 may execute the settlement processing using the magnetic read information. In a case in which the settlement method is the contact type IC card settlement, when acquiring the contact read information from the second card reader 17, the CPU 11 may execute the settlement processing using the contact read information. In a case in which the settlement method is the non-contact type IC card settlement, when acquiring the non-contact read information from the NFC_IC 14, the CPU 11 may execute the settlement processing using the non-contact read information. In a case in which the settlement method is the code settlement, when acquiring the code information by executing image recognition, the CPU 11 may execute the settlement processing using the code read information. In a case in which the settlement method is the electronic money card settlement, when acquiring the electronic money read information from the NFC_IC 14, the CPU 11 may execute the settlement processing using the electronic money read information. The CPU 11 may execute the settlement processing in cooperation with an external settlement server.

Here, the second card slot 17s and the lens is of the camera 25 are provided in the open space 30. Therefore, the second card reader 17 and the camera 25 can be provided at a relatively short distance. Therefore, according to the selected settlement method, the CPU 11 may exclusively control whether the second card reader 17 can execute reading and whether the camera 25 (the camera module md) can execute reading. Accordingly, electrical interference between the second card reader 17 and the camera 25 can be prevented, and reading performances of the second card reader 17 and the camera 25 can be improved.

Enabling reading executed by the camera module md may include, for example, turning on a power of the camera 25, the CPU 11 allowing the camera 25 to capture an image, or the CPU 11 allowing image recognition of the image captured by the camera 25. Disabling reading executed by the camera module md may include, for example, turning off the power of the camera 25, the CPU 11 prohibiting image capturing executed by the camera 25, or the CPU 11 prohibiting the image recognition of the image captured by the camera 25.

Specifically, when the credit card settlement (for example, the contact type IC card settlement) is selected as the settlement method, the CPU 11 may enable reading executed by the second card reader 17 and may disable reading executed by the camera module md. In this case, the payment terminal 100 can prevent the electrical interference between the second card reader 17 and the camera 25 at a time of the contact type IC card settlement, and can improve processing accuracy of the contact type IC card settlement.

When the code settlement is selected as the settlement method, the CPU 11 may enable reading executed by the camera module md and may disable reading executed by the second card reader 17. In this case, the payment terminal 100 can prevent the electrical interference between the second card reader 17 and the camera 25 at a time of the code settlement, and can improve the processing accuracy of the code settlement.

Next, a payment terminal 100X according to a comparative example is compared with the payment terminal 100 according to the present embodiment.

Figure 7:
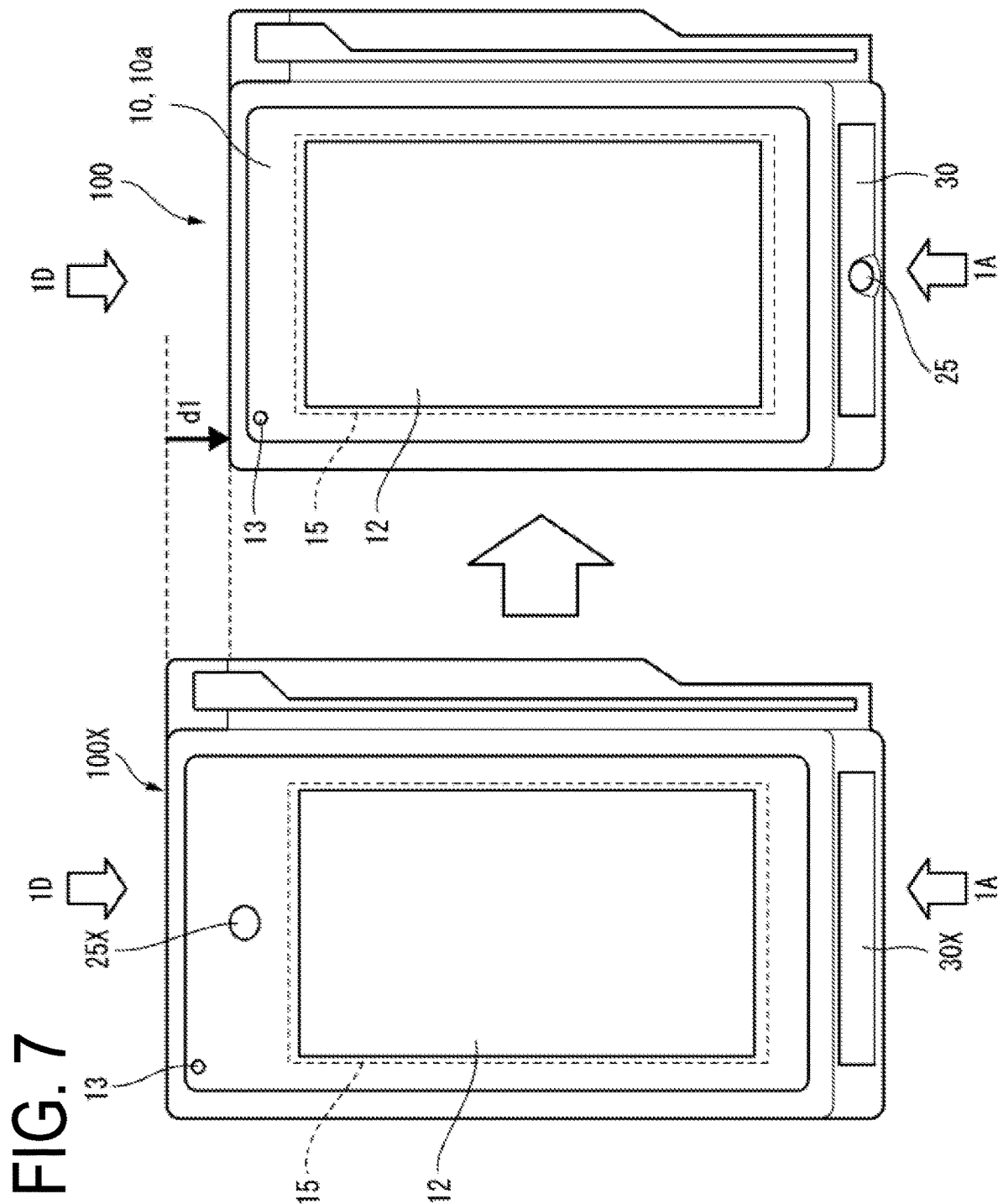
FIG. 7 is a view for comparing sizes of a payment terminal according to a comparative example and the payment terminal according to the exemplary embodiment.

FIG. 7 is a view for comparing sizes of the payment terminal 100X and the payment terminal 100. In the payment terminal 100X, the same configuration as the payment terminal 100 is denoted by the same reference numeral, and a configuration corresponding to the payment terminal 100 is denoted by adding "X" to an end of the same reference numeral.

In the payment terminal 100X according to the comparative example, a camera 25X is located on a rear surface 1D side of a main body 10X. In this case, a space for providing the camera 25X on the rear surface 1D side of the main body 10 is required. On the other hand, in the payment terminal 100 according to the present embodiment, the camera 25 is located on the front surface 1A side close to an insertion port of the second card slot 17s. Therefore, as compared with the payment terminal 100X according to the comparative example, the payment terminal 100 according to the present embodiment does not require a space for providing the camera 25 on the rear surface 1D side of the main body 10, a length of the payment terminal 100 in a front-rear direction (an upper-lower direction in FIG. 7) can be reduced by an amount corresponding to a distance d1 (for example, 15 mm to 16 mm), and the size of the payment terminal 100 can be reduced.

Figure 8:
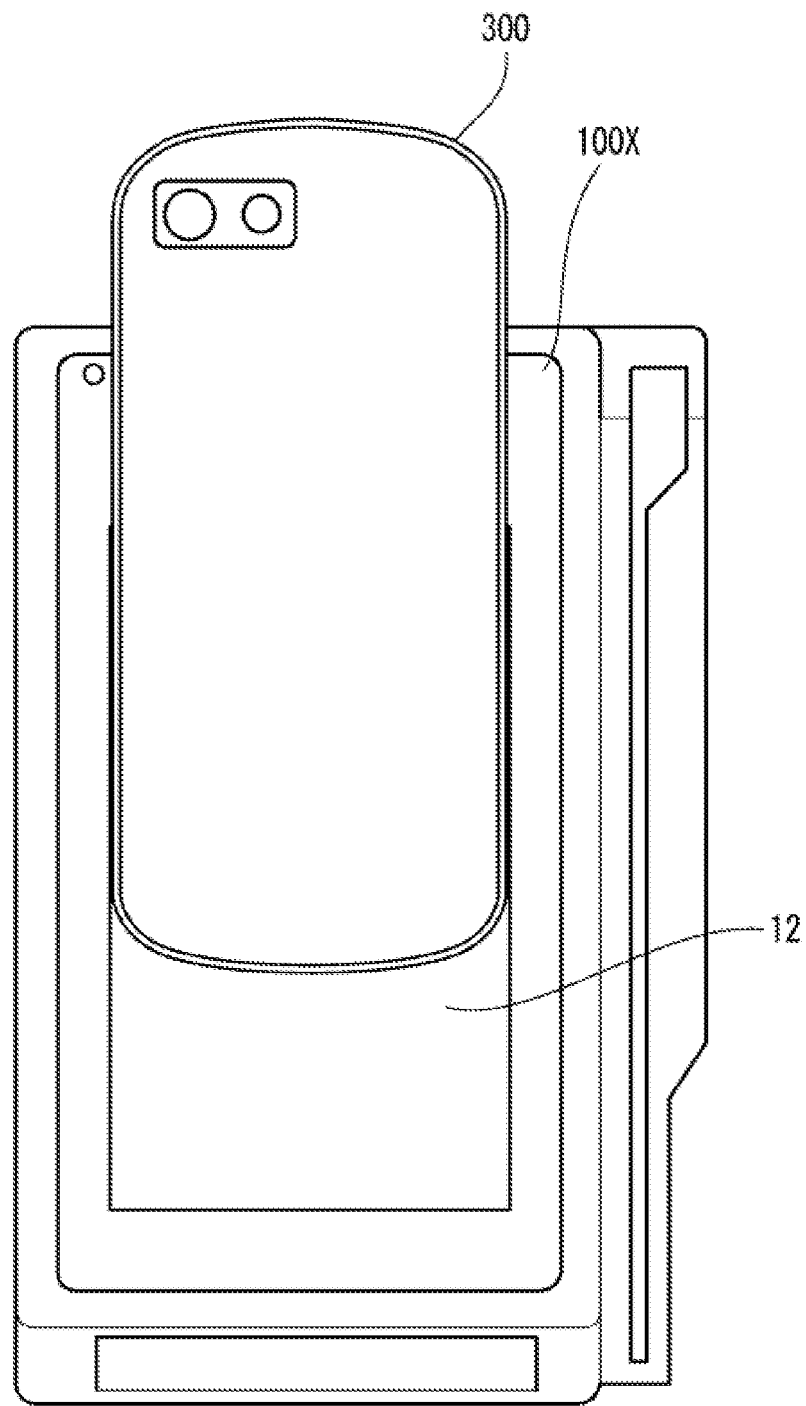
FIG. 8 shows a state in which a mobile terminal is brought close to the payment terminal according to the comparative example to execute a code settlement.

FIG. 8 shows a state in which the mobile terminal 300 is brought close to the payment terminal 100X according to the comparative example to execute a code settlement. Here, a position of the camera 25X of the payment terminal 100X is the same as that in a state in FIG. 7.

In the payment terminal 100X, when the user brings the mobile terminal 300 close to the camera 25X on an upper surface of the payment terminal 100X in order to execute a code settlement, the display region of the touch panel 12 is hidden in a wide range due to the mobile terminal 300 or the like, and it is difficult to check the information displayed in the display region of the touch panel 12.

Figure 9:
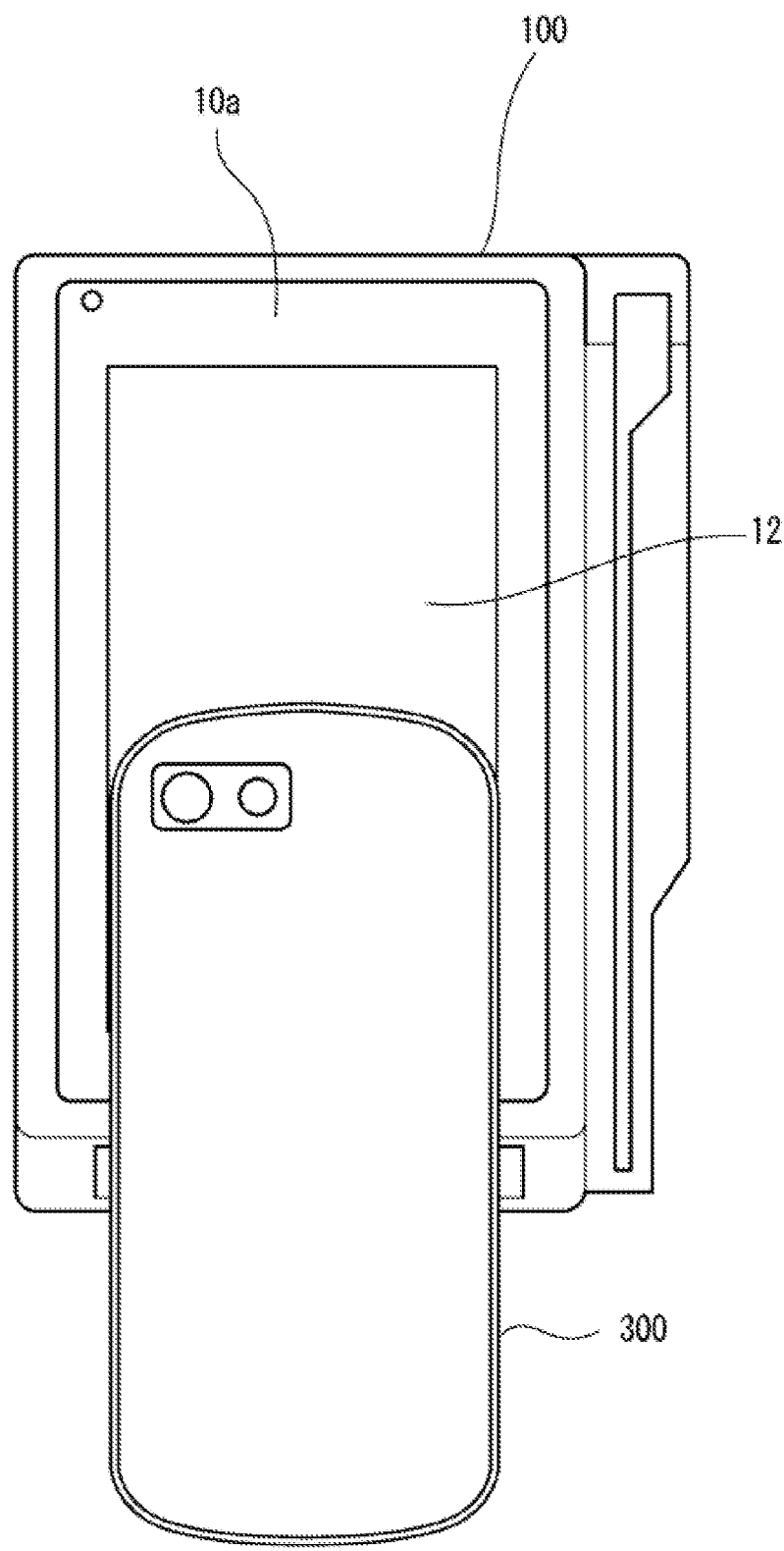
FIG. 9 shows a state in which a mobile terminal is brought close to the payment terminal according to the exemplary embodiment to execute a code settlement.

FIG. 9 shows a state in which the mobile terminal 300 is brought close to the payment terminal 100 according to the present embodiment to execute a code settlement. Here, a position of the camera 25 of the payment terminal 100 is the same as that in a state in FIG. 7.

In the payment terminal 100, even when the user brings the mobile terminal 300 close to the panel arrangement surface 10a of the mobile terminal 100 in order to execute a code settlement, the display region of the touch panel 12 is not much hidden due to the mobile terminal 300 or the like, and a state in which the information displayed on the touch panel 12 is easily checked can be maintained. That is, according to an arrangement of the camera 25 in the payment terminal 100, the camera 25 is provided away from the panel arrangement surface 10a, so that the payment terminal 100 can reduce an area of the touch panel 12 hidden due to the mobile terminal 300 itself or a hand or a finger of the user when the mobile terminal 300 is held over the panel arrangement surface 10a of the payment terminal 100 at the time of a code settlement. Therefore, the payment terminal 100 can improve visibility of the display region of the touch panel 12. The information displayed on the touch panel 12 includes, for example, a preview image, a guidance image, and guidance information that are to be referred to at the time of a code settlement.

Figure 10:
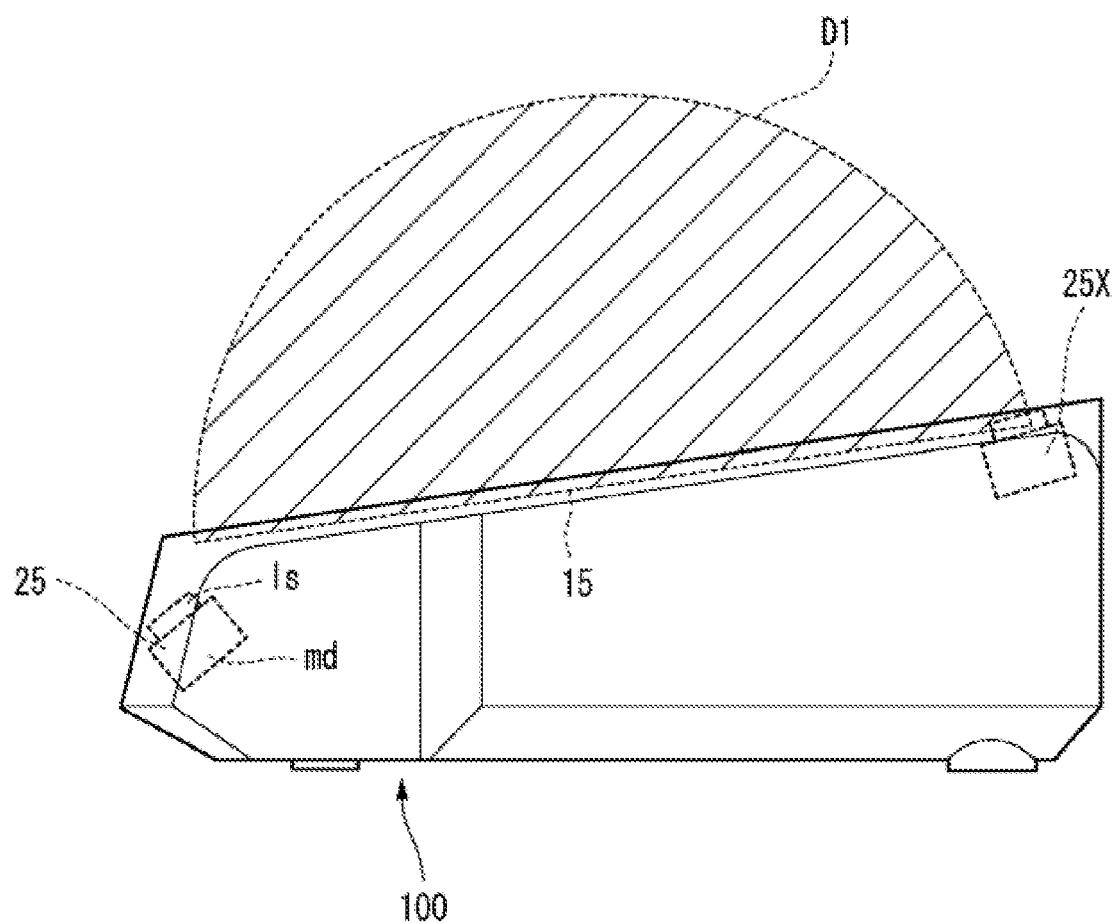
FIG. 10 shows an example of positional relation between an arrangement position of a camera and a radiation range of radio waves from an NFC antenna.

FIG. 10 shows an example of positional relation between the arrangement position of the camera 25 and a radiation range D1 of radio waves from the NFC antenna 15.

The radio waves radiated from the NFC antenna 15 reach the radiation range D1. The radiation range D1 is a range in which intensity of the radio waves radiated from the NFC antenna 15 is a threshold value th1 or greater, and is a range in which a settlement using the non-contact type IC card C3 can be executed by communicating with the non-contact type IC card C3. The radiation range D1 of the radio waves from the NFC antenna 15 is formed in a direction from a surface defined by the NFC antenna 15 toward the outside of the payment terminal 100.

As in the payment terminal 100X according to the comparative example shown in FIG. 7, it is assumed that the camera 25X is provided in a vicinity of the upper surface of the payment terminal 100X and on the rear surface 1D side as shown in FIG. 10. In this case, at least a part of the camera 25X enters the radiation range D1 of the radio waves from the NFC antenna 15. When a metal component is provided in a vicinity of the NFC antenna 15, electrical interference occurs in the NFC antenna 15, and it is difficult to sufficiently exhibit an antenna performance. Therefore, when the NFC antenna 15 is used, electrical interference with the camera 25X which is a metal component occurs, and image quality of an image captured by the camera 25X may deteriorate or a communication performance using the NFC antenna 15 may deteriorate.

In contrast, in the payment terminal 100, the camera 25 is provided closer to the placement surface α than the NFC antenna 15 inside the payment terminal 100. Therefore, the camera 25 is located outside the radiation range D1 of the radio waves from the NFC antenna 15. Therefore, the camera 25 includes the camera module and configured to execute various types of electrical processing such as image capturing and image processing. However, the payment terminal 100 can be designed without considering the electrical interference with the camera 25 when the NFC antenna 15 is used. Even in this case, the payment terminal 100 can prevent deterioration of the image quality of the image captured by the camera 25 or deterioration of the communication performance using the NFC antenna 15.

Figure 11:
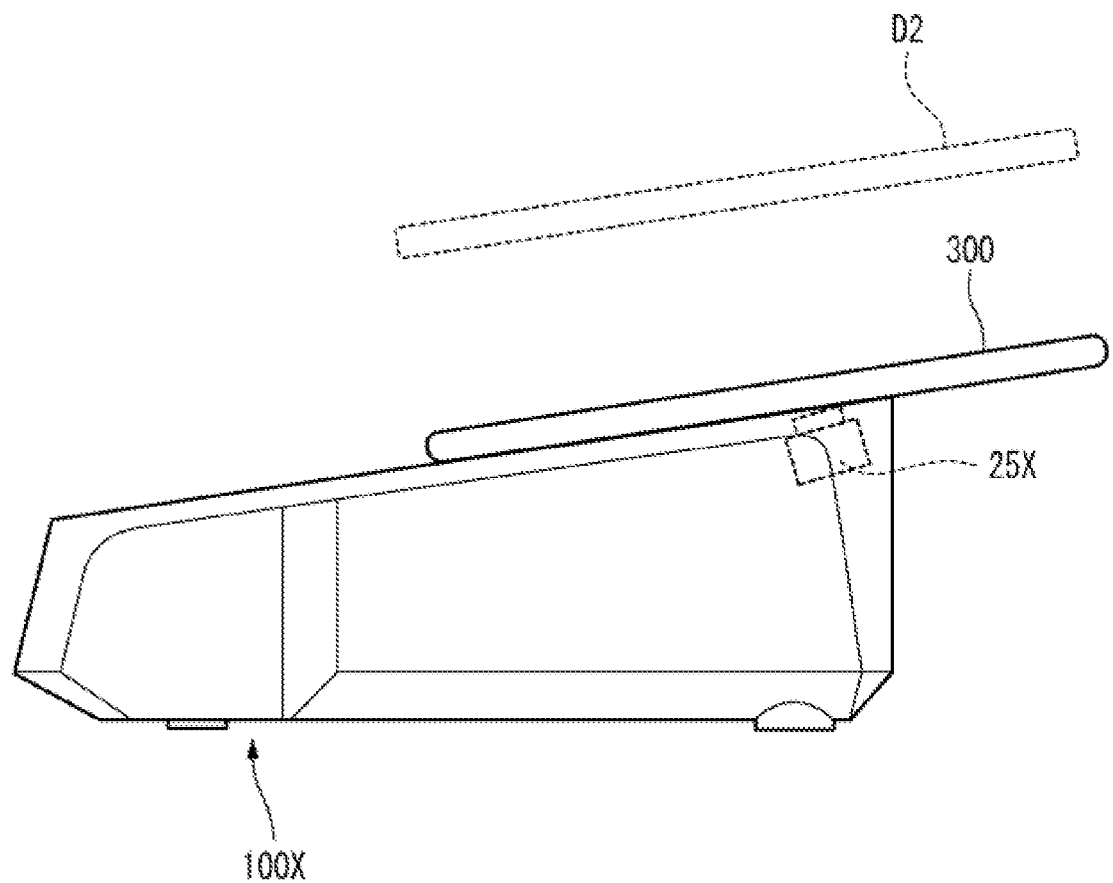
FIG. 11 is a side view showing an arrangement position of a mobile terminal whose code can be read by a camera provided in the payment terminal according to the comparative example.

FIG. 11 is a side view showing an arrangement position of the mobile terminal 300 with respect to the camera 25X provided in the payment terminal 100X according to the comparative example.

In the comparative example in FIG. 11, as in the payment terminal 100X according to the comparative example shown in FIG. 7, it is assumed that the camera 25X is provided in the vicinity of the upper surface of the payment terminal 100X and on the rear surface 1D side. In this case, since the upper surface of the payment terminal 100X is a flat surface, it is assumed that, at the time of a code settlement, the user often causes the display surface that displays the code of the mobile terminal 300 to face the upper surface of the payment terminal 100X and brings the display surface into contact with the upper surface. That is, the display surface of the mobile terminal 300 which is a flat surface and the panel arrangement surface 10a near the arrangement position of the camera 25X are easily brought into direct contact (directly attached) with each other. In this case, a distance between the display surface of the payment terminal 100X and the camera 25X cannot be sufficiently secured, and the arrangement of the mobile terminal 300 is out of a recommended arrangement recommended range D2. The arrangement recommended range D2 is a range in which the code can be suitably read, is a range in which the entire display surface of the mobile terminal 300 is included in an image capturing range of the camera, and is, for example, a range in which a distance from the camera is approximately 10 cm. Therefore, in this case, since a distance from the camera 25X to the mobile terminal 300 is shortened, it is difficult for the payment terminal 100 to capture the entire code displayed as the subject, and the recognition accuracy of the code captured by the camera 25X may be insufficient.

Figure 12:
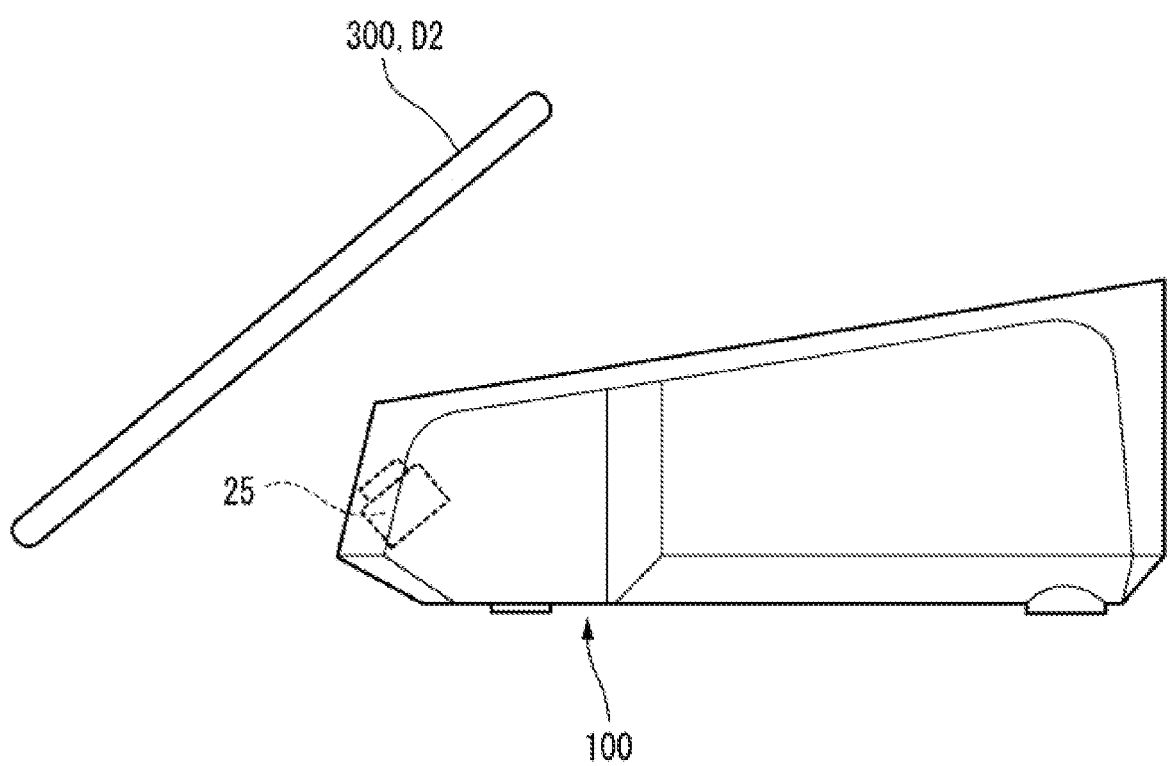
FIG. 12 is a side view showing an example of an arrangement position of a mobile terminal whose code can be read by the camera provided in the payment terminal according to the exemplary embodiment.

FIG. 12 is a side view showing an example of an arrangement position of the mobile terminal 300 with respect to the camera 25 provided in the payment terminal 100 according to the present embodiment.

The camera 25 is provided on the front surface 1A side in the payment terminal 100, and is provided on a placement surface α side (a bottom surface side of the payment terminal 100) with respect to the second card slot 17s. Since the open space 30 and the recess H1 are present around the camera 25, a foremost surface of the payment terminal 100 is a substantially square surface (see FIG. 1). Therefore, an area of an object that can be brought into contact with the foremost surface of the payment terminal 100 in a planar manner is small. The surface 10b at a lower portion of the foremost surface of the payment terminal 100 is located slightly above the placement surface α of the counter 50. Therefore, it is difficult to bring a contact target (for example, the mobile terminal 300) into contact with the surface 10b at the lower portion of the foremost surface of the payment terminal 100 in the planar manner. Therefore, it is difficult to directly attach the display surface of the mobile terminal 300 to the foremost surface of the payment terminal 100. In this case, it is considered that the user often provides the mobile terminal 300 with respect to the payment terminal 100 by adjusting the position and an orientation of the mobile terminal 300 such that the display surface of the mobile terminal 300 is included in the image capturing range of the camera 25. That is, since the mobile terminal 300 is held by being separated from the camera 25 of the payment terminal 100, the distance between the camera 25 and the mobile terminal 300 at a time of reading the code can be secured. In this case, the mobile terminal 300 is easily positioned inside the arrangement recommended range D2. Therefore, in this case, the payment terminal 100 can easily capture an image of the entire code displayed as the subject, and can improve the recognition accuracy of the code captured by the camera 25.

In order to provide the mobile terminal 300 in the arrangement recommended range D2 at the time of a code settlement, it is conceivable to provide a guide frame or a guide plate that guides the arrangement of the mobile terminal 300 with respect to the payment terminal 100. The guide plate may be, for example, a transparent plate. However, in this case, since it is necessary to separately provide the guide frame or the transparent guide plate in the payment terminal, the size of the payment terminal is increased. The settlement accuracy of the code settlement can be improved. However, the guide frame or the guide plate may inhibit the settlement processing according to the settlement methods other than the code settlement. That is, it is difficult to achieve both the code settlement and the settlement methods other than the code settlement.

In contrast, in the payment terminal 100 according to the present embodiment, it is not necessary to separately provide the guide frame or the guide plate, and it is possible to prevent an increase in the size of the payment terminal 100. The payment terminal 100 can favorably achieve both the code settlement and a settlement according to the settlement methods other than the code settlement without the guide frame or the guide plate inhibiting the settlement according to the settlement methods other than the code settlement.

It is also conceivable that a distance from the camera provided in the payment terminal can be separated inside the payment terminal. In other words, it is conceivable to secure a reading distance for reading the code inside the payment terminal. In the payment terminal, a mirror or the like may be used to secure the reading distance. The payment terminal has a transparent placement surface, and the mobile terminal 300 is placed on the placement surface, so that the position of the mobile terminal 300 with respect to the payment terminal is automatically in the arrangement recommended range D2. That is, even when the mobile terminal is directly attached to the placement surface, the entire code enters the image capturing range of the camera. However, in this case, components and the like cannot be provided in a range of a predetermined distance from the camera in an image capturing direction of the camera, and a space required for the camera becomes large. Since the space required for the camera is large, if components (for example, various card readers or NFC antennas) for the settlement according to the settlement methods other than the code settlement are further provided, the size of the payment terminal is increased.

In contrast, in the payment terminal 100 according to the present embodiment, the space required for the camera 25 is the same as a camera space in the normal payment terminal, and it is possible to prevent an increase in the space required for the camera 25. Even if components (for example, various card readers or the NFC antenna 15) for the settlement according to the settlement methods other than the code settlement are further provided, it is possible to prevent the payment terminal 100 from becoming larger than necessary.

In this way, since the payment terminal 100 is provided close to the front surface 1A side and a bottom surface (a surface on the placement surface α side) of the main body 10, it is not necessary to provide the lens is of the camera 25 on the panel arrangement surface 10a. Therefore, at a time of capturing an image using the camera 25 (for example, at the time of a code settlement), in the payment terminal 100, it is possible to prevent the display region of the touch panel 12 from being blocked with a hand, a finger, or the like of the user and to prevent the visibility of the display executed by the touch panel 12 from being fictitious, that is, to prevent the visibility of the touch panel 12 from being deteriorated.

The position of the second card slot 17s is set to a height of a certain level or larger such that the hand of the user does not hit the placement surface α of the payment terminal 100 when the contact type IC card C2 is inserted into the second card slot 17s. Even in this case, the lens 1s and the main body of the camera 25 are provided between the second card slot 17s and the placement surface α, so that the user can naturally insert the hand holding the contact type IC card C2 between the contact type IC card C2 and the placement surface α. Therefore, even in this arrangement of the camera 25, it is possible to smoothly execute the contact type IC card settlement and to reduce the size of the payment terminal 100.

In terms of reading executed by the camera 25 and reading executed by the second card reader 17, according to the settlement method, the CPU 11 may enable one of the reading and may disable the other. For example, when the camera 25 is used (for example, when the code settlement is executed), the CPU 11 may enable the reading executed by the camera 25 (the camera module md), and may disable the reading executed by the second card reader 17. For example, when the contact type IC card C2 is used (for example, when the contact type IC card settlement is executed), the CPU 11 may enable the reading executed by the second card reader 17, and may disable the reading executed by the camera 25 (the camera module md). In this case, the second card slot 17s and the camera 25 are provided at a short distance, so that the size of the payment terminal 100 can be reduced, and an influence on the settlement processing can be reduced.

The second card slot 17s and the lens 1s of the camera 25 are provided in the open space 30, so that the second card slot 17s and the lens 1s of the camera 25 can be provided locally in a concentrated manner, and the size of the payment terminal 100 can be further reduced.

As described above, the payment terminal 100 according to the present embodiment includes the lens 1s of the camera 25 configured to capture an image (for example, an image of the code), the second card slot 17s (an example of a card slot) into which the contact type IC card C2 is inserted, and the touch panel 12. In the height direction from the placement surface α on which the payment terminal 100 is placed, the panel arrangement surface 10a is formed on which the lens 1s, the second card slot 17s, and the touch panel 12 are arranged in order from the vicinity of the placement surface α. When the user faces the second card slot 17s in front (an example of the front surface 1A side), the panel arrangement surface 10a is oriented obliquely upward toward the user, an optical axis direction of the lens 1s is obliquely upward toward the user, and the lens 1s is provided closer to the user than the second card slot 17s.

Accordingly, the panel arrangement surface 10a is oriented obliquely upward toward the user, so that the display surface of the touch panel 12 faces a direction of the user. Therefore, the user can easily check a display content of the touch panel 12. The lens 1s of the camera 25 and the second card slot 17s are provided in order from the vicinity of the placement surface α, so that a hand or a finger of the user of the contact type IC card C2 can be naturally inserted between the placement surface α and the contact type IC card C2. Therefore, the user can smoothly perform an operation for the contact type IC card settlement. Further, since the lens 1s of the camera 25 are not provided on the panel arrangement surface 10a, the size of the panel arrangement surface 10a can be reduced, which leads to a reduction in the size of the payment terminal 100. Since it is difficult to provide the electronic components at the lower portion (that is, on the placement surface α side) of the second card reader 17, the lens 1s is provided at a lower portion of the second card reader 17, so that the arrangement efficiency of the camera 25 can be improved. The optical axis direction of the lens 1s is obliquely upward toward the user, so that the user can capture an image of the code by the camera 25 by directing the display surface of the mobile terminal 300 on which the code is displayed toward the camera 25. Therefore, the CPU 11 can read the code by executing image analysis on the captured code. The lens 1s is provided closer to the user than the second card slot 17s, so that the user can more easily hold the display surface of the mobile terminal 300 on which the code is displayed with respect to the camera 25. In this way, the payment terminal 100 can support various settlement methods, can reduce the size of the payment terminal 100, can improve the arrangement efficiency of the camera 25 (an example of the image capturing unit), and can improve the visibility of touch panel 12 (an example of the display unit) at a time of capturing an image by the camera 25.

The payment terminal 100 may further include the camera module md of the camera 25 configured to capture an image through the lens 1s, and the second card reader 17 configured to acquire information stored in the contact type IC card C2 from the contact type IC card C2 inserted into the second card slot 17s. In the height direction from the placement surface α, the camera module md and the second card reader 17 may be arranged in order from the vicinity of the placement surface α.

If the camera module md is provided in the vicinity of the panel arrangement surface 10a, the camera 25 is provided at an upper portion (that is, on a panel arrangement surface 10a side) of the second card reader 17. Since other electronic components (for example, the NFC antenna 15, the touch panel, and components related to the NFC antenna 15 and the touch panel) are provided at the upper portion of the second card reader 17, the electronic components are easily provided in a dense manner. On the other hand, it is difficult to provide an electronic component at the lower portion (that is, on the placement surface α side) of the second card reader 17. In contrast, the camera module md and the second card reader 17 are arranged in order from the vicinity of the placement surface α, the payment terminal 100 can effectively utilize a dead space that is likely to be formed at the lower portion (that is, on the placement surface α side) of the second card reader 17. Therefore, the payment terminal 100 can improve the arrangement efficiency of the camera 25.

The payment terminal 100 may further include the NFC antenna 15 (an example of an antenna) configured to execute near field communication. The camera module md may be provided outside the radiation range D1 of the radio waves from the NFC antenna 15.

Accordingly, the payment terminal 100 can prevent electrical interference between the NFC antenna 15 and the camera 25 when the NFC antenna 15 is used. Therefore, the payment terminal 100 can prevent deterioration of the image quality of the image captured by the camera 25 or deterioration of the communication performance using the NFC antenna 15.

The payment terminal 100 may further include the CPU 11 (an example of a control device) to which the camera module md and the second card reader 17 are electrically connected. When the credit card settlement is selected as the settlement method, the CPU 11 may enable reading executed by the second card reader 17 and may disable reading executed by the camera module md.

Accordingly, even when the camera 25 and the second card reader 17 are provided at a short distance, the payment terminal 100 can prevent simultaneous operation of the camera 25 and the second card reader 17 at the time of a contact type IC card settlement, and can prevent electrical interference between the camera 25 and the second card reader 17. Therefore, the payment terminal 100 can prevent occurrence of a reading error or the like at the time of the contact type IC card settlement serving as the credit card settlement, and can execute the contact type IC card settlement with high accuracy.

When the code settlement is selected as the settlement method, the CPU 11 may enable reading executed by the camera module md and may disable reading executed by the second card reader 17.

Accordingly, even when the camera 25 and the second card reader 17 are provided at a short distance, the payment terminal 100 can prevent simultaneous operation of the camera 25 and the second card reader 17 at the time of a code settlement, and can prevent electrical interference between the camera 25 and the second card reader 17. Therefore, the payment terminal 100 can prevent the occurrence of the reading error or the like based on an image including a code captured by the camera 25 at the time of the code settlement, and can execute the code settlement with high accuracy.

The payment terminal 100 may have the open space 30 on a front side facing the user. The second card slot 17s and the lens 1s may be provided in the open space 30.

Accordingly, in the payment terminal 100, the second card slot 17s and the lens 1s of camera 25 can be provided in a concentrated manner in a narrow space in which the open space 30 is present, the arrangement efficiency of the electronic components in the payment terminal 100 can be improved, and the size of the payment terminal 100 can be further reduced.

The open space 30 may have the recess H1. The recess H1 is formed such that a part of the lower surface 30b (an example of a first surface) located on a side of a surface of the payment terminal 100 facing the open space 30 and the surface 10b (an example of a second surface) continuous from the lower surface 30b and located on a front side of the payment terminal 100 are recessed. The side of the surface of the payment terminal 100 facing the open space 30 is close to the placement surface α. The lens is may be provided in the recess H1.

Accordingly, since the lens 1s is provided at a recessed position away from the front side in the open space 30, for example, even when the user tries to execute a settlement according to another settlement method (for example, the contact type IC card settlement), it is possible to reduce a chance of contacting the lens 1s of the camera 25. The lens 1s is provided at a position where dust or the like is not likely to reach. Therefore, damage or adhesion of dirt to the lens 1s of the camera 25 can be prevented, and accuracy of code reading based on an image captured by the camera 25 can be maintained at a high level.

Various embodiments are described above with reference to the drawings. However, it is needless to say that the present invention is not limited thereto. It will be apparent to those skilled in the art that various changes and modifications may be conceived within the scope of the claims. It is also understood that the various changes and modifications belong to the technical scope of the present invention. Further, constituent elements in the above-described embodiments may be combined freely within a range not departing from the spirit of the present invention.

In the above-described embodiment, the camera 25 mainly captures an image of the two-dimensional code displayed on the display surface of the mobile terminal 300. However, the present disclosure is not limited thereto. For example, the camera 25 may capture an image of a barcode of a point card or a barcode of a parking ticket. The camera 25 may capture an image of a passport, for example, in a tax-free store. When the image of a passport is captured, information (for example, a photograph) other than a code may be captured. The CPU 11 may execute image analysis on the captured image, may acquire identification information on the code and identification information on the passport, and may use the identification information for subsequent various types of processing.

In the above-described embodiment, in terms of the NFC_IC 14, the first card reader 16, and the second card reader 17, it has been mainly described that data is read from a card. However, data may be written. That is, the NFC_IC 14, the first card reader 16, and the second card reader 17 can at least read data, and may be able to write data. In this case, a control whether to enable the writing may be executed in a similar manner to the control whether to enable the reading. Data may be written using the identification information of the code captured and analyzed by the camera 25.

In the above-described embodiment, the processor may be physically implemented in any way. When a programmable processor is used, a processing content can be changed by changing a program, so that a degree of freedom in designing the processor can be increased. The processor may be implemented by one semiconductor chip or may be physically implemented by a plurality of semiconductor chips. When the processor is implemented by a plurality of semiconductor chips, controls according to the above-described embodiment may be implemented by different semiconductor chips. In this case, it can be considered that one processor is implemented by the plurality of semiconductor chips. The processor may be implemented by a semiconductor chip and a member (such as a capacitor) having a different function from that of the semiconductor chip. One semiconductor chip may be configured to implement a function of the processor and another function. A plurality of processors may be implemented by one processor.

The present disclosure is useful for a payment terminal that can support various settlement methods, can reduce a size of the payment terminal, can improve arrangement efficiency of an image capturing unit, and can improve visibility of a display unit at a time of capturing an image.

What is claimed is:

1. A payment terminal comprising:
   a camera configured to capture an image, the camera including a lens;
   a card slot for inserting a contact type IC card; and
   a panel arrangement surface on which a touch panel is arranged,
   wherein the card slot and the panel arrangement surface are arranged in order in a height direction from a placement surface of the payment terminal;
   wherein the panel arrangement surface is oriented obliquely upward toward a user positioned in front of the card slot;
   wherein an optical axis direction of the lens is obliquely upward toward the user,
   the lens is provided closer to the placement surface of the payment terminal than the card slot in the height direction, and closer to the user than the card slot in a depth direction,
   the lens is provided below the panel arrangement surface and below a lower end of the card slot in the height direction, and
   the lens is provided in front of a front end of the card slot in the depth direction.

2. The payment terminal according to claim 1, further comprising:
   a camera module of the camera configured to capture an image through the lens; and
   a card reader configured to acquire information stored in the contact type IC card from the contact type IC card inserted in the card slot,
   wherein the camera module and the card reader are provided in order in the height direction from the placement surface.

3. The payment terminal according to claim 2, further comprising:
   an antenna for near field communication,
   wherein the camera module is provided outside a radiation range of radio waves from the antenna.

4. The payment terminal according to claim 2, further comprising:
   a processor electrically connected to the camera module and the card reader,
   wherein when a credit card settlement is selected as a settlement method, the processor enables reading executed by the card reader and disables reading executed by the camera module.

5. The payment terminal according to claim 2, further comprising:
   a processor electrically connected to the camera module and the card reader,
   wherein when a code settlement is selected as a settlement method, the processor enables reading executed by the camera module and disables reading executed by the card reader.

6. The payment terminal according to claim 2, wherein the lens, the card slot, the card reader and the panel arrangement surface are provided in order in the height direction from the placement surface.

7. The payment terminal according to claim 1, wherein an open space is provided on a front surface of the payment terminal facing the user; and
   wherein the card slot and the lens are provided in the open space.

8. The payment terminal according to claim 7, wherein a first surface is one of the surfaces constituting the open space and is located near the placement surface;
   wherein a second surface is connected to the first surface and is located on a front surface of the payment terminal;
   wherein a recess is formed such that a part of the first surface and a part of the second surface are recessed; and
   wherein the lens is provided inside the recess.

9. The payment terminal according to claim 1, wherein the card slot is elongated in a width direction, which is perpendicular to the height direction and the depth direction, and is provided in a front surface of the payment terminal, the front surface intersecting the panel arrangement surface and facing the user.

10. The payment terminal according to claim 9, further comprising a magnetic card slot for swiping a magnetic card, the magnetic card slot being elongated in the depth direction.

11. A payment terminal used in a placed state, comprising:
   a touch panel provided on a top surface of a main body of the payment terminal;
   a card slot for inserting a contact type IC card;
   a recess provided on a front of the main body of the payment terminal, the front of the main body facing a user; and
   a camera configured to capture an image, the camera including a lens,
   wherein the lens of the camera is provided inside the recess;
   the card slot is provided on the front of the main body,
   the lens is provided closer to a placement surface, on which the main body of the payment terminal is placed, than the card slot in a height direction, and closer to the user than the card slot in a depth direction,
   the lens is provided below the top surface and below a lower end of the card slot in the height direction, and
   the lens is provided in front of a front end of the card slot in the depth direction, and
   wherein an optical axis direction of the lens is obliquely upward toward the user.

12. The payment terminal according to claim 11, further comprising:
   an open space provided on the front of the main body of the payment terminal;
   wherein the card slot is provided inside the open space.

13. The payment terminal according to claim 12, wherein the recess is formed such that a part of a peripheral end of the open space close to the placement surface is recessed.

14. The payment terminal according to claim 12, further comprising:
   a camera module of the camera configured to capture an image through the lens;
   a card reader configured to acquire information stored in the contact type IC card from the contact type IC card inserted in the card slot; and
   a processor electrically connected to the camera module and the card reader,
   wherein when a credit card settlement is selected as a settlement method, the processor enables reading executed by the card reader and disables reading executed by the camera module.

15. The payment terminal according to claim 14, further comprising:
   an antenna for near field communication,
   wherein the camera module is provided outside a radiation range of radio waves from the antenna.

* * * * *